US010616161B1

(12) United States Patent
Grabovitch et al.

(10) Patent No.: US 10,616,161 B1
(45) Date of Patent: Apr. 7, 2020

(54) COMPUTERIZED SYSTEM AND METHOD FOR DIGITAL CONTENT EXTRACTION AND PROPAGATION IN HTML MESSAGES

(71) Applicant: OATH INC., New York, NY (US)

(72) Inventors: Irena Grabovitch, Haifa (IL); Dotan Di Castro, Haifa (IL); Umang Patel, Sunnyvale, CA (US); Ian McCarthy, Sunnyvale, CA (US)

(73) Assignee: OATH INC., New York, NY (US)

( * ) Notice: Subject to any disclaimer, the term of this patent is extended or adjusted under 35 U.S.C. 154(b) by 8 days.

(21) Appl. No.: 16/158,744

(22) Filed: Oct. 12, 2018

(51) Int. Cl.
*G06F 15/16* (2006.01)
*H04L 12/58* (2006.01)
*G06F 17/22* (2006.01)

(52) U.S. Cl.
CPC .......... *H04L 51/12* (2013.01); *G06F 17/2247* (2013.01); *H04L 51/08* (2013.01); *H04L 51/18* (2013.01); *H04L 51/22* (2013.01); *H04L 51/26* (2013.01)

(58) Field of Classification Search
CPC ......... H04L 51/08; H04L 51/12; H04L 51/18; H04L 51/22; H04L 51/26; G06F 17/2247
USPC ........................................................ 709/207
See application file for complete search history.

(56) References Cited

U.S. PATENT DOCUMENTS

| 8,745,191 | B2* | 6/2014 | Raleigh | G06Q 30/016 455/414.1 |
| 8,935,247 | B1* | 1/2015 | Tholome | G06F 16/355 707/736 |
| 2009/0254572 | A1* | 10/2009 | Redlich | G06Q 10/06 |
| 2010/0250497 | A1* | 9/2010 | Redlich | F41H 13/00 707/661 |
| 2017/0345075 | A1* | 11/2017 | Khandelwal | G06Q 30/0623 |
| 2019/0306090 | A1* | 10/2019 | Shang | H04W 4/023 |

* cited by examiner

*Primary Examiner* — Frantz B Jean
(74) *Attorney, Agent, or Firm* — James J. DeCarlo; Greenberg Traurig, LLP

(57) ABSTRACT

Disclosed are systems and methods for improving interactions with and between computers in content providing, searching and/or hosting systems supported by or configured with devices, servers and/or platforms. The disclosed systems and methods provide a novel framework for partitioning HTML content in electronic messages based on the relative positions of the content's links within the DOM hierarchy of the messages, and basing the propagation (e.g., display or communication) of such content therefrom. The disclosed message partitioning and extraction framework can be applied online, in real-time, at scale, without any pre-processing or pre-learning/training.

20 Claims, 6 Drawing Sheets

COMPUTERIZED SYSTEM AND METHOD FOR DIGITAL CONTENT EXTRACTION AND PROPAGATION IN HTML MESSAGES

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates generally to improving the performance of content hosting and providing devices, systems and/or platforms by modifying the capabilities and providing non-native functionality to such devices, systems and/or platforms through a novel and improved framework for partitioning Hypertext Markup Language (HTML) content in electronic messages based on the relative positions of the content's links within the Document Object Model (DOM) hierarchy of the messages, and basing the propagation (e.g., display or communication) of such content thereon.

BACKGROUND

The growth and usage of machine generated electronic mail has seemingly become ubiquitous over the last few years. Auto-generated content such as, for example, purchase receipts, order confirmations, travel reservations, events and social notifications, to name just a few examples, are routinely created by commercial companies and organizations, and account for over 90% of the non-spam Web mail traffic. In fact, on a daily basis, such forms of electronic messages (i.e., emails) can amount to billions of messages.

The task of precisely identifying key elements within this form of digital content in a truly scalable manner is of great importance to both users and service providers, and can be leveraged for applications such as ad re-targeting, mail search, and mail summarization.

However, conventional techniques employed by online parties relies on complex clustering mechanisms. This has many technical drawbacks, of which, for example, is the large amount of messages that need to be pre-processed. That is, in order for conventional systems to properly partition and identify key content links, items or portions of messages, these systems need to be trained on large sample sets of messages. This leads to large amounts of system resources and network throughput being wasted by such systems during the pre-processing steps in receiving, accepting or identifying messages, then actually performing the analysis. Such systems are wasting vital network and computing device (e.g. server) resources by requiring any system that desires to perform message extraction to devote large amounts of its processing power and memory resources to the development of the system's capabilities, which leads to a resource drain on the computing devices executing the systems as well as the network infrastructure they are operating on/within.

SUMMARY

The disclosed systems and methods provide a technical solution to existing technical problems, especially those highlighted above, by providing an improved message partitioning and extraction framework that can be applied online, in real-time, at scale, without any pre-processing or pre-learning/training. The disclosed framework, according to some embodiments, partitions identified, received or incoming HTML content in email messages based on the relative positions of the links in the message's DOM hierarchy. The partitioning is leveraged into identifying meaningful entities within the messages. For example, if a message constitutes a travel reservation, the resulting partition of the message will entail the identification of the travel information (e.g., travel dates, modes of transportation, traveler information, and the like) from the specific fields of the message. According to embodiments of the disclosed systems and methods, the effectiveness of the disclosed framework is in the detection or identification of the pertinent sections in these automatically generated email messages.

The technical steps performed by the disclosed framework are critical for many applications such as ad retargeting, mail search, and mail summarization, and can be leveraged to enhance many user-facing features, such as coupon clipping and travel alerts. As opposed to the approaches of conventional techniques, the disclosed framework embodies a novel, technically efficient approach that leverages the analysis of HTML links within messages, as they play a key role in identifying and extracting valuable information about an email message. Thus, the disclosed systems and methods are capable of automatically detecting key fragments in email messages by focusing solely on the links and their locations in the content.

Semantically distinct portions of an email message, or a web page, tend to contain unique links that reference particular content in the DOM. These links enable the disclosed framework (e.g., the entity identification engine 300, as discussed in more detail below) to partition the DOM tree of particular messages into subtrees based on their contained normalized links (i.e., links that point to the same content, landing page, or that indicate different actions such as click location indicators). As discussed in more detail below, especially with regard to FIGS. 3-5, these subtrees are then analyzed so that particular entity types are identified (e.g., commercial entity content), then the corresponding entities are extracted for propagation to users on their devices.

While the discussion herein will focus on commercial emails and the commercial content disclosed herein (e.g., messages from content providers that can include digital content associated with coupons, advertisements and the like), it should not be construed as limiting, as any type of content type or entity provider can form the basis for the message analysis disclosed herein—for example, purchased items, flights, and show tickets, and the like. Indeed, the disclosure herein focuses on the analysis of email messages; however, any type of message or form of content—for example, web pages, can be analyzed according to similar techniques without departing from the scope of the instant disclosure.

In accordance with one or more embodiments, the instant disclosure provides computerized methods for a message partitioning and extraction framework that can be applied online, in real-time, at scale, without any pre-processing or pre-learning/training. The disclosed framework, according to some embodiments, partitions identified, received or incoming HTML content in email messages based on the relative positions of the links in the message's DOM hierarchy. The partitioning is leveraged into identifying meaningful entities within the messages, from which the entities' content is then propagated to users.

In accordance with one or more embodiments, the instant disclosure provides a non-transitory computer-readable storage medium for carrying out the above mentioned technical steps of the framework's functionality. The non-transitory computer-readable storage medium has tangibly stored thereon, or tangibly encoded thereon, computer readable instructions that when executed by a device (e.g., application server, email server, ad server, content server and/or client device, and the like) cause at least one processor to perform a method for a novel and improved framework for partitioning HTML content in electronic messages based on the relative positions of the content's links within the DOM hierarchy of the messages, and basing the propagation (e.g., display or communication) of such content therefrom.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DESCRIPTION OF EMBODIMENTS

Figure 1:
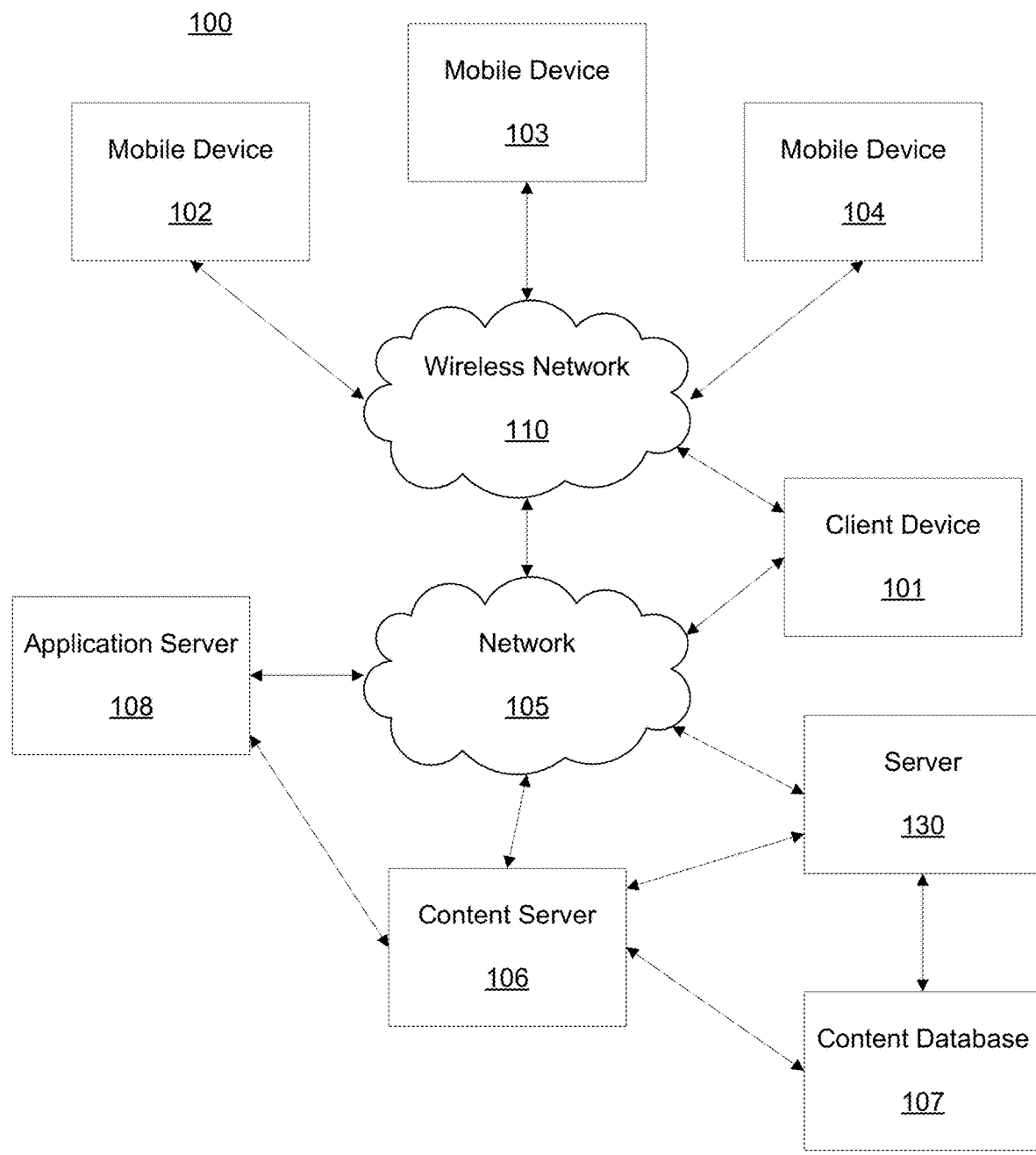
FIG. 1 is a schematic diagram illustrating an example of a network within which the systems and methods disclosed herein could be implemented according to some embodiments of the present disclosure.

The present disclosure will now be described more fully hereinafter with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, cloud storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), a content delivery network (CDN) or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further employ a plurality of network access technologies, including Wi-Fi, Long Term Evolution (LTE), WLAN, Wireless Router (WR) mesh, or 2nd, 3rd, $4^{th}$ or $5^{th}$ generation (2G, 3G, 4G or 5G) cellular technology, Bluetooth, 802.11b/g/n, or the like. Network access technologies may enable wide area coverage for devices, such as client devices with varying degrees of mobility, for example.

In short, a wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations, such as a web-enabled client device or previously mentioned devices may include a high-resolution screen (HD or 4K for example), one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of possible applications, such as a client software application enabling communication with other devices. A client device may also include or execute an application to communicate content, such as, for example, textual content, multimedia content, or the like. A client device may also include or execute an application to perform a variety of possible tasks, such as messaging functionality, browsing, searching, playing, streaming or displaying various forms of content, including locally stored or uploaded messages, images and/or video, or games (such as live broadcasts of professional sporting events).

As discussed herein, reference to an "advertisement" should be understood to include, but not be limited to, digital media content embodied as a media item that provides information provided by another user, service, third party, entity, and the like. Such digital ad content can include any type of known or to be known media renderable by a computing device, including, but not limited to, video, text, audio, images, and/or any other type of known or to be known multi-media item or object. In some embodiments, the digital ad content can be formatted as hyperlinked multi-media content that provides deep-linking features and/or capabilities. Therefore, while some content is referred to as an advertisement, it is still a digital media item that is renderable by a computing device, and such digital media item comprises content relaying promotional content provided by a network associated party.

The principles described herein may be embodied in many different forms. The disclosed systems and methods provide advanced mechanisms for partitioning HTML content in electronic messages based on the relative positions of the content's links within the DOM hierarchy of the messages, and basing the propagation (e.g., display or communication) of such content therefrom.

As discussed above, according to some embodiments, the disclosed techniques for partitioning commercial emails into meaningful entities is discussed through its applied effectiveness in detecting coupons and promotions within message content provided by service providers, commercial entities or other forms of third party entities providing users or other entities with content, services or products (e.g., referred to as commercial entities). As opposed to recent extraction techniques for HTML content, the disclosed methods and systems do not rely on complex clustering mechanisms that require the processing of a large sample of messages beforehand. Rather, the disclosed framework is scalable and can be applied in a real-time online environment for handling and processing new arriving messages without any additional data.

As discussed herein, the disclosed framework can detect references to products (or coupons or ads) in message HTML messages. For purposes of this disclosure, reference to HTML content in messages is describing both the HTML source code of the message pages, as well as the HTML code of the message content, as discussed in more detail below. Thus, according to the disclosed systems and methods, any HTML message or page can be divided into partitions such that each partition contains a single type of link to a specific product landing page that the user is redirected to after he clicked on a link. The partition typically corresponds to a sub-tree in the original DOM, which is the hierarchical representation of the HTML content, as discussed in more detail below.

According to some embodiments, the algorithm embodied by the disclosed methods and executed by the disclosed systems unfolds in three stages. First, candidates for e-commerce sections are identified by finding maximal sub-trees that contain at most a single type link (note that the same link can be found more than once in this sub-tree.). Then, the disclosed framework employs heuristics to determine which of the candidates correspond to e-commerce items. Finally, the disclosed framework extracts the relevant fields from the messages (or pages) that correspond to the respective products.

As discussed in more detail below at least in relation to FIG. 6, according to some embodiments, information associated with, derived from, or otherwise identified from, during or as a result of the entity content extraction/identification, as discussed herein, can be used for monetization purposes and targeted advertising when providing, delivering or enabling such devices access to content or services over a network. Providing targeted advertising to users associated with such discovered content can lead to an increased click-through rate (CTR) of such ads and/or an increase in the advertiser's return on investment (ROI) for serving such content provided by third parties (e.g., digital advertisement content provided by an advertiser, where the advertiser can be a third party advertiser, or an entity directly associated with or hosting the systems and methods discussed herein).

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102-104 and client device 101. FIG. 1 additionally includes a variety of servers, such as content server 106, application (or "App") server 108 and third party server 130.

One embodiment of mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information, as discussed above. As such, mobile devices 102-104 typically range widely in terms of capabilities and features.

Mobile devices 102-104 also may include at least one client application that is configured to receive content from another computing device. In some embodiments, mobile devices 102-104 may also communicate with non-mobile client devices, such as client device 101, or the like. In one embodiment, such communications may include sending and/or receiving messages, searching for, viewing and/or sharing photographs, digital images, audio clips, video clips, or any of a variety of other forms of communications.

Client devices 101-104 may be capable of sending or receiving signals, such as via a wired or wireless network, or may be capable of processing or storing signals, such as in memory as physical memory states, and may, therefore, operate as a server.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104.

Network 105 is configured to couple content server 106, application server 108, or the like, with other computing devices, including, client device 101, and through wireless network 110 to mobile devices 102-104. Network 105 is enabled to employ any form of computer readable media or network for communicating information from one electronic device to another.

The content server 106 may include a device that includes a configuration to provide any type or form of content via a network to another device. Devices that may operate as content server 106 include personal computers desktop computers, multiprocessor systems, microprocessor-based or programmable consumer electronics, network PCs, servers, and the like. Content server 106 can further provide a variety of services that include, but are not limited to, email services, instant messaging (IM) services, streaming and/or downloading media services, search services, photo services, web services, social networking services, news services, third-party services, audio services, video services, SMS services, MMS services, FTP services, voice over IP (VOIP) services, or the like.

Third party server 130 can comprise a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user data. Such sponsored advertising includes monetization techniques including sponsored search advertising, non-sponsored search advertising, guaranteed and non-guaranteed delivery advertising, ad networks/exchanges, ad targeting, ad serving and ad analytics. Such systems can incorporate near instantaneous auctions of ad placement opportunities during web page creation, (in some cases in less than 500 milliseconds) with higher quality ad placement opportunities resulting in higher revenues per ad. That is advertisers will pay higher advertising rates when they believe their ads are being placed in or along with highly relevant content that is being presented to users. Reductions in the time needed to quantify a high quality ad placement offers ad platforms competitive advantages. Thus, higher speeds and more relevant context detection improve these technological fields.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en-masse to advertisers. For web portals like Yahoo! ®, advertisements may be displayed on web pages or in apps resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, gender, occupation, etc.) for predicting user behavior, such as by group. Advertisements may be presented to users in a targeted audience based at least in part upon predicted user behavior(s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

In some embodiments, users are able to access services provided by servers 106, 108 and/or 130. This may include in a non-limiting example, authentication servers, search servers, email servers, social networking services servers, SMS servers, IM servers, MMS servers, exchange servers, photo-sharing services servers, and travel services servers, via the network 105 using their various devices 101-104.

In some embodiments, applications, such as a mail application (e.g., Yahoo! Mail®, Gmail®, and the like), blog, photo or social networking application (e.g., Facebook®, Twitter® and the like), search application (e.g., Yahoo! ® Search), and the like, can be hosted by the application server 108 (or content server 106 and the like).

Thus, the application server 108, for example, can store various types of applications and application related information including application data and user profile information (e.g., identifying and behavioral information associated with a user). It should also be understood that content server 106 can also store various types of data related to the content and services provided by content server 106 in an associated content database 107, as discussed in more detail below. Embodiments exist where the network 105 is also coupled with/connected to a Trusted Search Server (TSS) which can be utilized to render content in accordance with the embodiments discussed herein. Embodiments exist where the TSS functionality can be embodied within servers 106, 108 and/or 130.

Moreover, although FIG. 1 illustrates servers 106, 108 and 130 as single computing devices, respectively, the disclosure is not so limited. For example, one or more functions of servers 106, 108 and/or 130 may be distributed across one or more distinct computing devices. Moreover, in one embodiment, servers 106, 108 and/or 130 may be integrated into a single computing device, without departing from the scope of the present disclosure.

Figure 2:
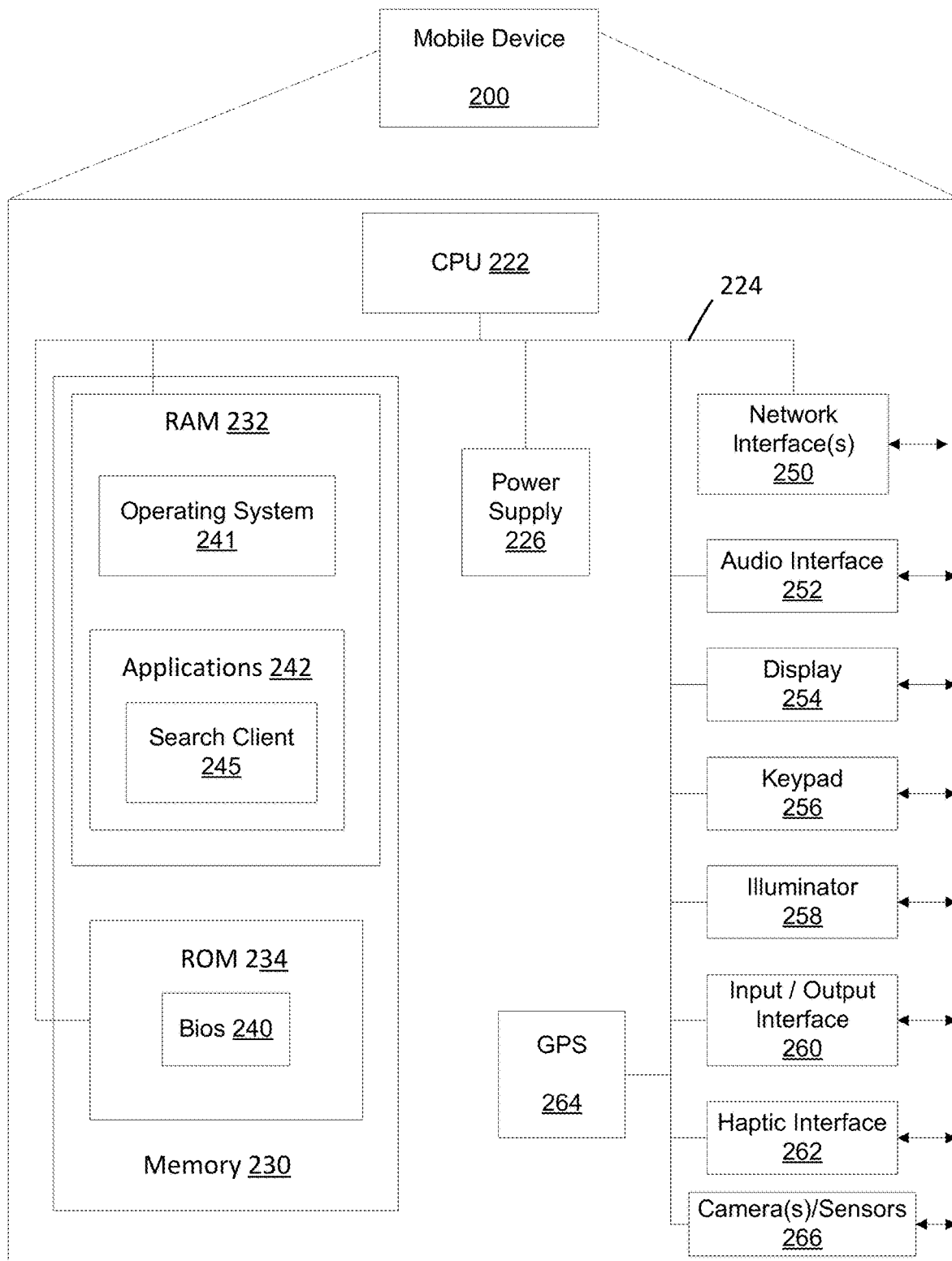
FIG. 2 depicts is a schematic diagram illustrating an example of client device in accordance with some embodiments of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, Client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, an optional global positioning systems (GPS) receiver 264 and a camera(s) or other optical, thermal or electromagnetic sensors 266. Device 200 can include one camera/sensor 266, or a plurality of cameras/sensors 266, as understood by those of skill in the art. The positioning of the camera(s)/sensor(s) 266 on device 200 can change per device 200 model, per device 200 capabilities, and the like, or some combination thereof. Power supply 226 provides power to Client device 200.

Client device 200 may optionally communicate with a base station (not shown), or directly with another computing device. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. Illuminator 258 may provide a status indication and/or provide light.

Client device 200 also comprises input/output interface 260 for communicating with external. Input/output interface 260 can utilize one or more communication technologies, such as USB, infrared, Bluetooth™, or the like. Haptic interface 262 is arranged to provide tactile feedback to a user of the client device.

Optional GPS transceiver 264 can determine the physical coordinates of Client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of Client device 200 on the surface of the Earth. In one embodiment, however, Client device may through other components, provide other information that may be employed to determine a physical location of the device, including for example, a MAC address, Internet Protocol (IP) address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of Client device 200. The mass memory also stores an operating system 241 for controlling the operation of Client device 200

Memory 230 further includes one or more data stores, which can be utilized by Client device 200 to store, among other things, applications 242 and/or other information or data. For example, data stores may be employed to store information that describes various capabilities of Client device 200. The information may then be provided to another device based on any of a variety of events, including being sent as part of a header (e.g., index file of the HLS stream) during a communication, sent upon request, or the like. At least a portion of the capability information may also be stored on a disk drive or other storage medium (not shown) within Client device 200.

Applications 242 may include computer executable instructions which, when executed by Client device 200, transmit, receive, and/or otherwise process audio, video, images, and enable telecommunication with a server and/or another user of another client device. Applications 242 may further include search client 245 that is configured to send, to receive, and/or to otherwise process a search query and/or search result.

Having described the components of the general architecture employed within the disclosed systems and methods, the components' general operation with respect to the disclosed systems and methods will now be described below with reference to FIGS. 3-6.

Figure 3:
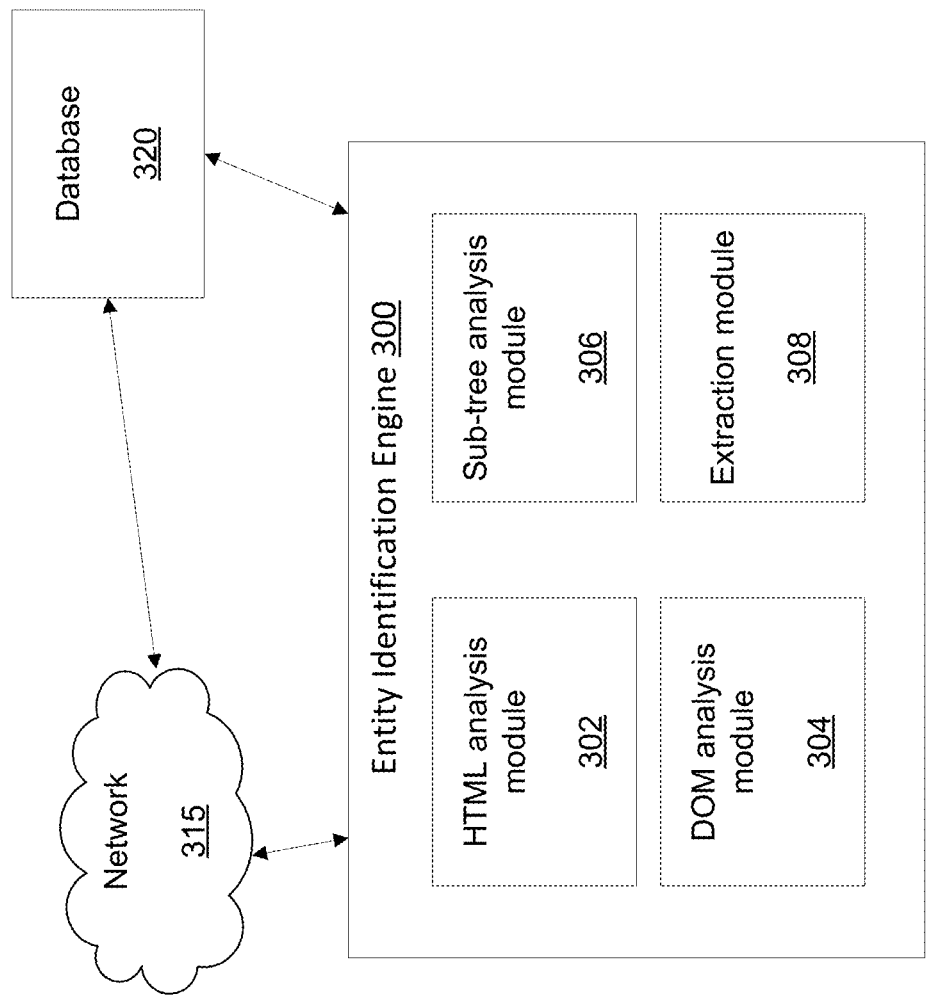
FIG. 3 is a block diagram illustrating components of an exemplary system in accordance with embodiments of the present disclosure.

FIG. 3 is a block diagram illustrating the components for performing the systems and methods discussed herein. FIG. 3 includes entity identification engine 300, network 315 and database 320. The entity identification engine 300 can be a special purpose machine or processor and could be hosted by an application server, content server, social networking server, web server, email server, search server, content provider, third party server, user's computing device, and the like, or any combination thereof.

According to some embodiments, entity identification engine 300 can be embodied as a stand-alone application that executes on a user device. In some embodiments, the entity identification engine 300 can function as an application installed on the user's device, and in some embodiments, such application can be a web-based application accessed by the user device over a network. In some embodiments, the entity identification engine 300 can be installed as an augmenting script, program or application (e.g., a plug-in or extension) to another application (e.g., Yahoo! Mail®).

The database 320 can be any type of database or memory, and can be associated with a content server on a network (e.g., content server, a search server or application server) or a user's device (e.g., device 101-104 or device 200 from FIGS. 1-2). Database 320 comprises a dataset of data and metadata associated with local and/or network information related to users, services, applications, content and the like. Such information can be stored and indexed in the database 320 independently and/or as a linked or associated dataset. As discussed above, it should be understood that the data (and metadata) in the database 320 can be any type of information and type, whether known or to be known, without departing from the scope of the present disclosure.

According to some embodiments, database 320 can store data for users, e.g., user data. According to some embodiments, the stored user data can include, but is not limited to, information associated with a user's profile, user interests, user behavioral information, user attributes, user preferences or settings, user demographic information, user location information, user biographic information, and the like, or some combination thereof. In some embodiments, the user data can also include user device information, including, but not limited to, device identifying information, device capability information, voice/data carrier information, Internet Protocol (IP) address, applications installed or capable of being installed or executed on such device, and/or any, or some combination thereof. It should be understood that the data (and metadata) in the database 320 can be any type of information related to a user, content, a device, an application, a service provider, a content provider, whether known or to be known, without departing from the scope of the present disclosure.

According to some embodiments, database 320 can store data and metadata associated with a user from an assortment of media and/or service providers and/or platforms. For example, the information can be related to, but not limited to, content type or category, information associated with the sender or recipient(s) of a message, information associated with content or text included in a message, and any other type of known or to be known attribute or feature associated with a message or content of a message, or some combination thereof.

According to some embodiments, information related to, derived from or otherwise determined from analysis of a user's inbox can be stored in database 320 as n-dimensional vector (or feature vector), where the information associated with each message can be translated as a node on the n-dimensional vector for an inbox. In some embodiments, each message can have its own vector where the information included therein can be represented by the nodes on a respective vector. In some embodiments, as messages are sent/received, detected and/or tracked, information corresponding thereto can also be stored in the database 320 in a similar manner.

Database 320 can store and index inbox/message information in database 320 as linked set of inbox/message data and metadata, where the data and metadata relationship can be stored as the n-dimensional vector. Such storage can be realized through any known or to be known vector or array storage, including but not limited to, a hash tree, queue, stack, VList, or any other type of known or to be known dynamic memory allocation technique or technology. It should be understood that any known or to be known computational analysis technique or algorithm, such as, but not limited to, cluster analysis, data mining, Bayesian network analysis, Hidden Markov models, artificial neural network analysis, logical model and/or tree analysis, and the like, and be applied to determine, derive or otherwise identify vector information for messages within an inbox.

For purposes of the present disclosure, as discussed above, messages (which are stored and located in database 320) as a whole are discussed within some embodiments; however, it should not be construed to limit the applications of the systems and methods discussed herein. That is, while reference is made throughout the instant disclosure to messages (e.g., email messages), other forms of messages (e.g., social media messages, Instant Messages (IMs)) and the content included therein, including, text, audio, images, multimedia, RSS feed information, can be used without departing from the scope of the instant application, which can thereby be communicated and/or accessed and processed by the entity identification engine 300 according to the systems and methods discussed herein.

As discussed above, with reference to FIG. 1, the network 315 can be any type of network such as, but not limited to, a wireless network, a local area network (LAN), wide area network (WAN), the Internet, or a combination thereof. The network 315 facilitates connectivity of the entity identification engine 300, and the database of stored resources 320. Indeed, as illustrated in FIG. 3, the entity identification engine 300 and database 320 can be directly connected by any known or to be known method of connecting and/or enabling communication between such devices and resources.

The principal processor, server, or combination of devices that comprises hardware programmed in accordance with the special purpose functions herein is referred to for convenience as entity identification engine 300, and includes HTML analysis module 302, DOM analysis module 304, sub-tree analysis module 306 and extraction module 308. It should be understood that the engine(s) and modules discussed herein are non-exhaustive, as additional or fewer engines and/or modules (or sub-modules) may be applicable to the embodiments of the systems and methods discussed. The operations, configurations and functionalities of each module, and their role within embodiments of the present disclosure will be discussed below.

Figure 4:
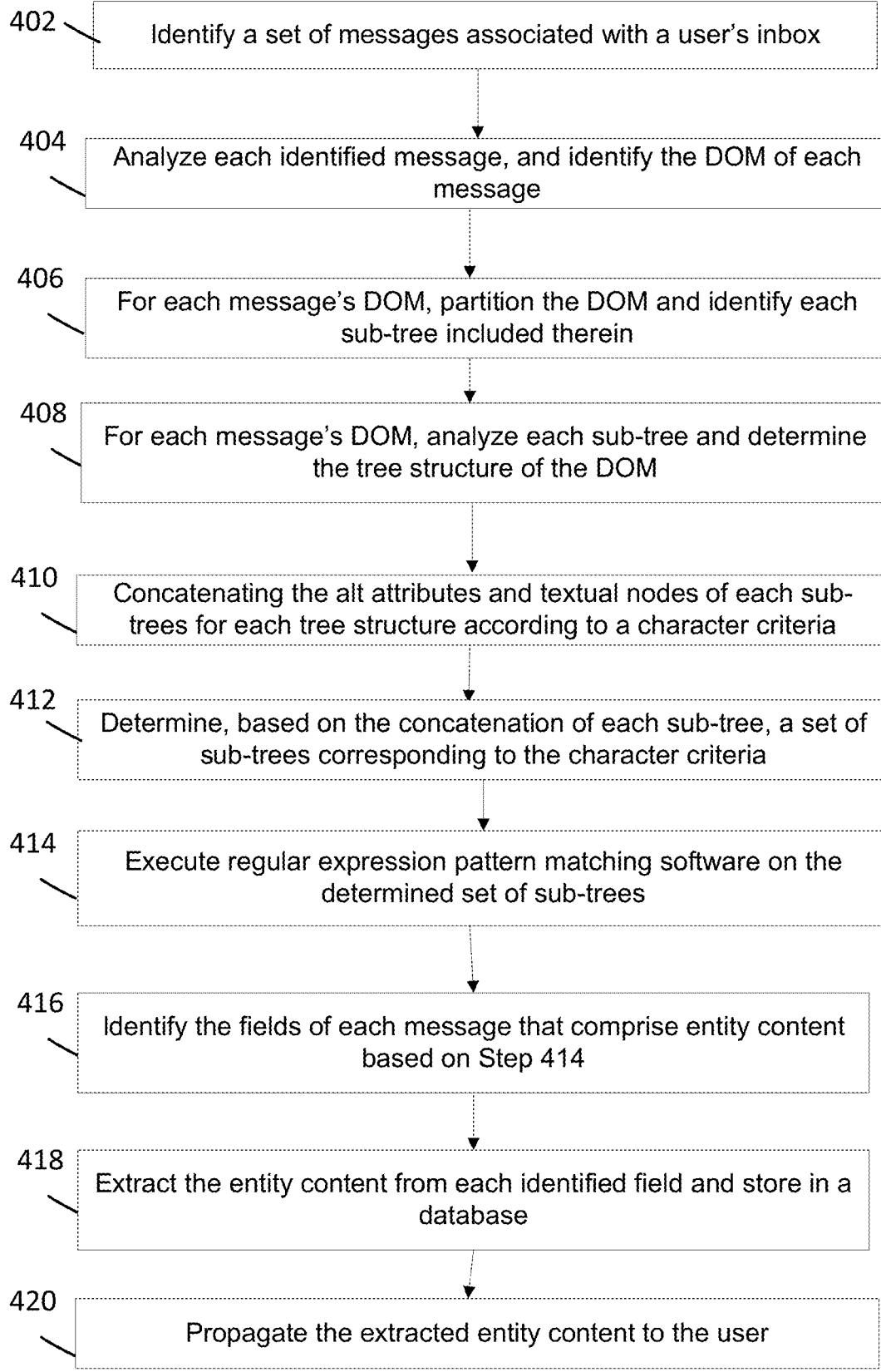
FIG. 4 is a block diagram illustrating a data flow of an exemplary system in accordance with some embodiments of the present disclosure.

Turning to FIG. 4, an overall data flow is disclosed for partitioning HTML content in electronic messages based on the relative positions of the content's links within the DOM hierarchy of the messages, and basing the propagation (e.g., display or communication) of such content therefrom. Process 400 of FIG. 4 provides embodiments for devices (e.g., content servers, email servers, user devices, and the like) to process data in a novel manner, via the disclosed message partitioning and analysis, applied heuristics and extraction, thereby leading to increased efficiency and effectiveness in the protocol utilized for providing users digital content.

According to some embodiments, Steps 402-404 of Process 400 are performed by the HTML analysis module 302 of the entity identification engine 300; Step 406 is performed by the DOM analysis module 304; Steps 408-412 are performed by the sub-tree analysis module 306; and Steps 414-420 are performed by the extraction module 308.

Process 400 begins with Step 402 where a message, or set of messages, are identified. According to some embodiments, the identified message(s) is an incoming message sent by a sender that is directed to and received at a recipient's inbox. In some embodiments, the steps of Process 400 can be performed for each incoming message received in a recipient's inbox.

In some embodiments, the set of messages analyzed by Process 400 can be a set of messages identified from the user's inbox. The identification of the messages can be based on a criteria such that only a set of all the messages in the inbox are identified. Such criteria can reference a type of message (e.g., commercial messages), a time period, location associated with a message(s) (e.g., where was the message sent from, what location does the message reference, where was the message received, and the like), an identity of a sender, other recipients of a message (e.g., if it was a group message), which platform the message originated from (e.g., was it a message from another messaging platform), is the message unread, was the message acted upon (e.g., was it forwarded, responded to, saved, categorized or deleted), or how was the message checked/read (e.g., did the user open and read the message from an application on his/her mobile device), and the like, or some combination thereof.

Therefore, according to some embodiments, Step 402 involves analyzing received or incoming messages according to the criteria and identifying a message set (e.g., a single message or a plurality of messages) that satisfy the criteria. This enables engine 300 to efficiently analyze and process a smaller set of messages, as those messages not satisfying the criteria are filtered out, which alleviates the system from having to perform the computationally draining clustering techniques conventional systems employ.

For example, Step 402 can involve determining a set of messages that are sent by commercial entities. For example, a user receives 100 emails a day—therefore, according to Step 402, engine 300 can identify which of those 100 emails are from commercial entities (e.g., Groupon®, Walgreens®, Walmart®, and the like). According to some embodiments, Step 402 can involve parsing the inbox data of the user's inbox and identify each message in the set therein (e.g., based on the criteria).

In Step 404, each message in the identified set of messages from Step 402 is then parsed and analyzed such that the message data and metadata included in each message is identified (or extracted). Step 404 results in the identification of the DOM for each message, which as discussed below, provides a structure or model of the types of content and information the message is referencing and/or includes. For example, if the message includes a travel itinerary, the DOM includes links (or elements) referencing the travel information, and the sender (e.g., was it booked through a travel website or directly from an airline's portal).

In Step 406, the DOM for each message is partitioned such that the sub-trees included within each DOM are identified. According to some embodiments, the partitioning process of Step 406 (and Step 408) can be embodied and described according Algorithm 1:

---

Algorithm 1: GetCandidates(node r)

input :A DOM tree rooted in node r
output:A set of nodes with disjoint maximal rooted sub-trees,
    each containing a single and unique rooted link.
/* Make initial recursive call with root node. */
return GetCandidatesRec(r)
Subroutine GetCandidatesRec (node v)
  v.rootedLinks ← θ
  if v contains a link l then
    v.rootedLinks ← {l}
  Candidates ← θ
  for u ∈ v.children do
    Candidates ← Candidates ∪ GetCandidatesRec (u)
    v.rootedLinks ← v.rootedLinks ∪ u.rootedLinks
  for u ∈ v.children do
    if |v.rootedLinks| > 1 and |u.rootedLinks| = 1 then
      Candidates ← Candidates + u
  return Candidates According to some embodiments, Step 406 involves analyzing the DOM tree structure for each message in a bottom-up manner. Therefore, for each DOM, the bottom (or end) of the DOM structure is identified, and the engine 300 begins its analysis there. That is, beginning at the bottom of the tree structure and traversing upwards, each of the nodes in the DOM are identified. This involves determining whether the nodes are parents (i.e., is a rooted link) or children to other nodes and how they are related (as discussed in relation to FIG. 5 below). Step 406 involves, based on the rooted link identification, identifying sub-tree structures within the overall DOM structure.

In Step 408, the overall DOM tree structure for each message is determined based on analysis of each node's relationship to other nodes. That is, whenever a node in the DOM is a rooted link to more than sub-tree with a unique link, those sub-trees are filtered out (referred to as "pruning out") and treated as isolated item-partitions (or separate sub-tree structures). Steps 406-408 halt when the root of the DOM tree for each message is reached via the bottom-up analysis performed by engine 300.

Figure 5:
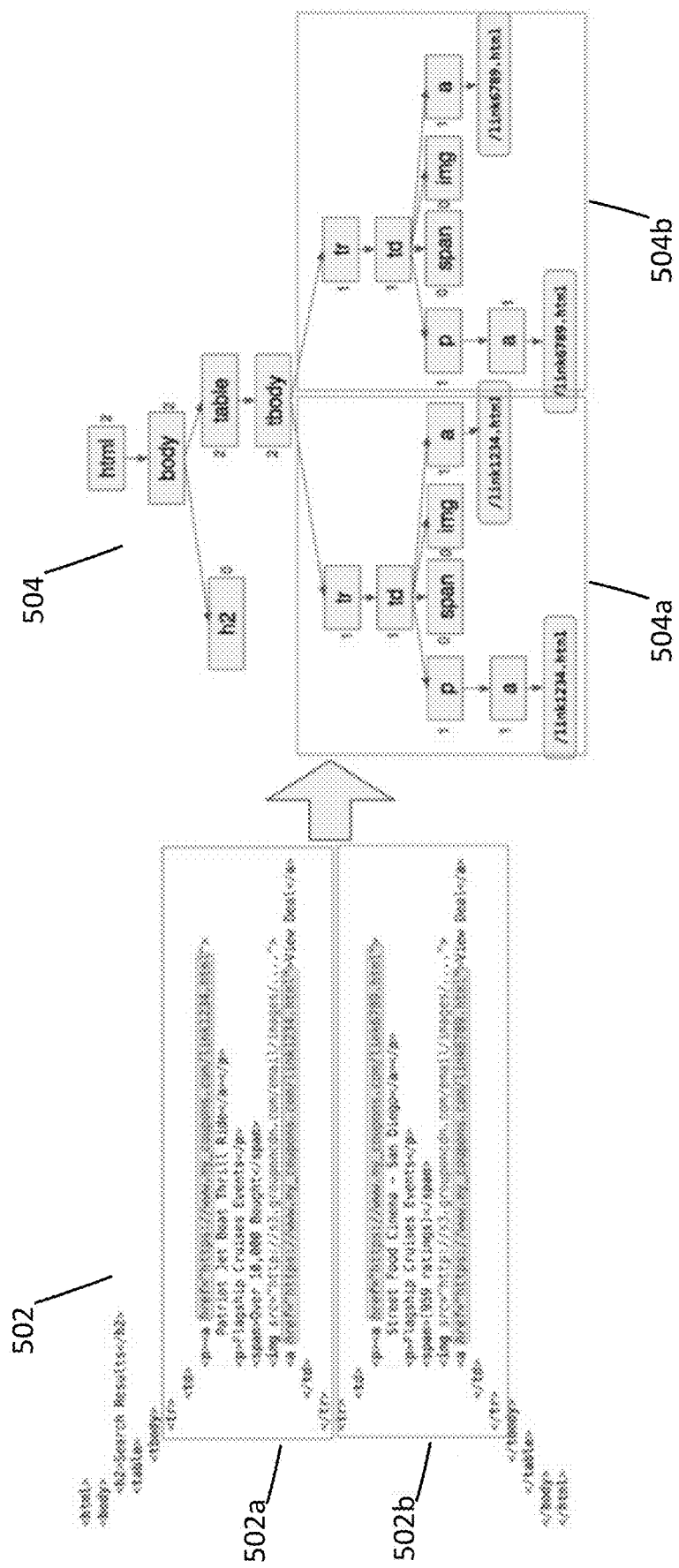
FIG. 5 is an exemplary embodiment of the entity identification analysis being performed within an electronic message according to some embodiments of the present disclosure.

FIG. 5 illustrates a non-limiting example embodiment of the execution of Steps 406-408 through the depiction of HTML snippets from a Groupon® message 502 referencing deals for two e-commerce entities. FIG. 5 includes the HTML code snippets: item 502a and 502b. Item 502a references Groupon coupon content for "Patriot Jet Boat Thrill Rides," and its DOM tree is represented in item 504a. Item 502b references Groupon coupon content for "Street Food Cinema," and its DOM tree is represented in item 504b.

In the DOM tree 504 for message 502, each of the subtrees (items 504a and 504b) share the rooted link <tbody>. This is identified by traversing the DOM 504 from the bottom up and identifying <tbody> as being a rooted link for more than one subtree (here, 2 subtrees). Therefore, as Process 400 proceeds, as discussed more below, these sub-trees 504a and 504b are pruned out and treated as their own individual/independent tree structure/model.

As a result of Steps 406-408, a candidate listing of sub-trees for each DOM (for each message in the message set) is identified.

In Step 410, the candidate listing of sub-trees are analyzed in order to identify which sub-trees represent content from a particular type of entity—for purposes of this disclosure, commercial (or e-commerce) entity types are being used. This identification (or determination) is made by concatenating the alt attributes and textual nodes of each sub-tree in the candidate listing according to character criteria that corresponds to commercial entity content. Typically, commercial entity content within messages or pages contain either a currency ("$") or percentage ("%") sign (or both). Therefore, Step 410 involves generating a textual representation of each sub-tree by concatenating the textual values of its alt attributes and textual nodes, and filtering-out any candidates for which their textual representations do not contain a particular character—e.g., a currency or percentage sign.

Thus, based on the analysis occurring in Step 410, Step 412 results in determining a set of sub-trees that represent digital content associated with coupon or advertisement of a good, service or a general e-commerce entity (e.g., the set of sub-trees being a subset of the candidate listing of subtrees from Steps 406-408).

In Step 414, engine 300 executes software defined by a regular expression (regex) algorithm on the sub-tree set identified in Step 412. The regex algorithm can be any type of known or to be known algorithm that identifies a sequence of characters, pattern of characters, a target of characters, and the like, such as a string searching algorithm. As a result of the regex software execution occurring in Step 414, Step 416 involve identifying the fields of each message that comprise entity content from commercial entities.

According to some embodiments, for example, Steps 414-416 involve identifying the fields of a message (or page) that indicate the specifics of the coupon or ad from the messages—such as, for example, the original price, sale price, expiration date and the textual description of the coupon. According to some embodiments, for fields with values that have a predefined format (e.g., date and price), Step 414 can involve engine 300 applying regex pattern matching software. In some embodiments, for the textual field of description, engine 300 executes a heuristic algorithm that uses the textual representation of a sub-tree, and filters-out repeated phrases and frequent phrases that appear in multiple candidate sub-trees (e.g., "view deal", or "shop now" can be filtered out as they are common to commercial types of messages).

In Step 418, the entity content for each identified field is extracted and is stored in a database. The extracted content can be stored in a look-up table (LUT) in association with the identified field information from Step 4116, which enables a more efficient search and retrieval of the entity content (as discussed in more detail below in relation to Step 420). The database can be associated with the user's inbox.

In Step 420, extracted entity content is propagated to a user. According to some embodiments, such propagation can be based on, or part of, coupon/ad clipping systems, coupon/ad recommendation systems and/or coupon/ad summarization algorithms. Conventional versions of such systems perform the computationally draining task of performing the entity extraction before providing the coupon/ad views they are configured for; therefore, by such conventional systems utilizing the extracted entity content process of Process 400, they can be provided with advanced and improved functionality of utilizing the entity content that is already extracted (thereby eliminating the need for them to perform such task). For example, the number of CPU cycles can be reduced by such systems, as they can focus on providing the content without having to perform the computational tasks of extracting the content from messages/pages. This saves on systems resources and improves the performance of the devices hosting and/or executing such systems.

Figure 6:
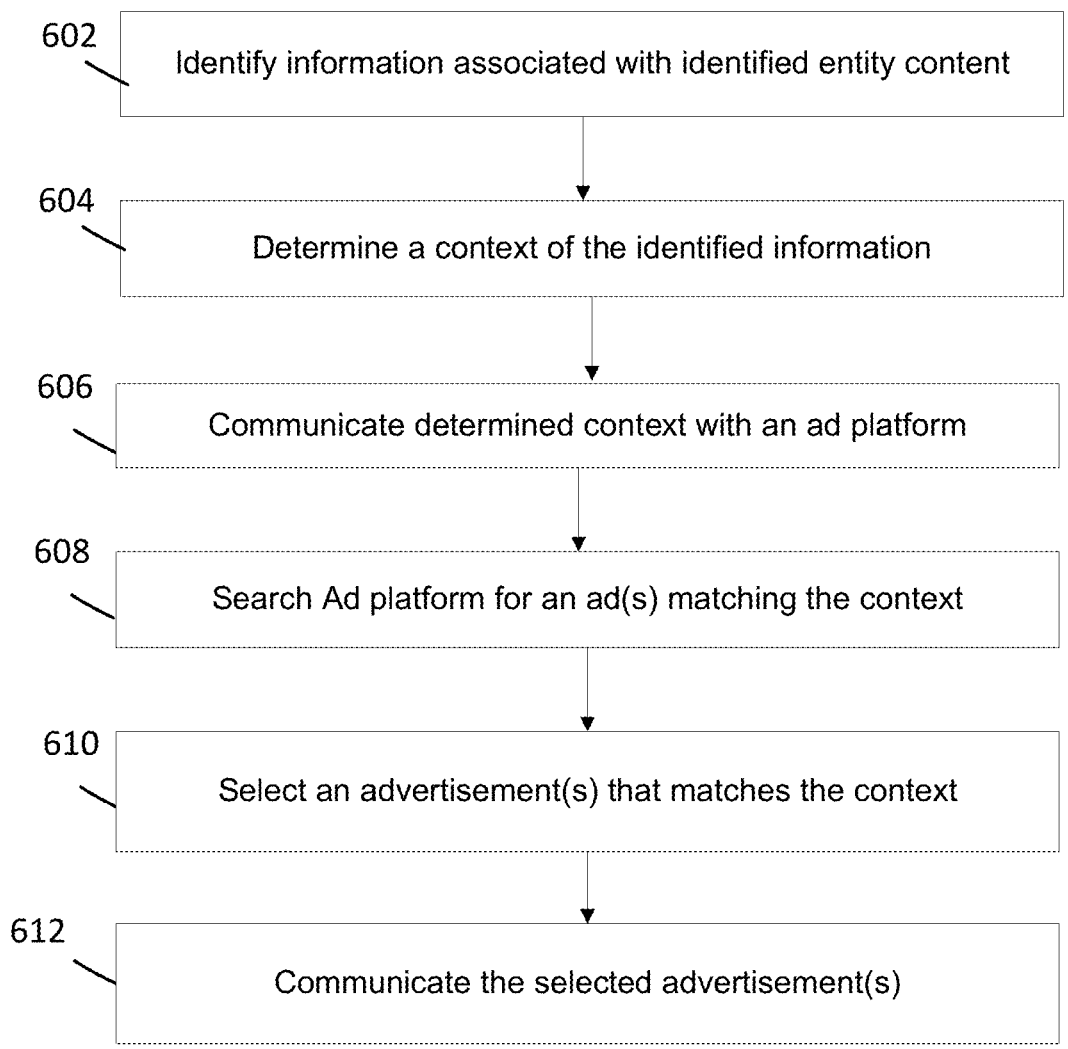
FIG. 6 is a block diagram illustrating a data flow of an exemplary system in accordance with some embodiments of the present disclosure.

FIG. 6 is a work flow example 600 for serving related digital media content based on the information associated with an extracted entity content item, as discussed above in relation to FIGS. 3-5. In some embodiments, the content can be associated with or comprising advertisements (e.g., digital advertisement content). Such content, referred to as "entity content information" for reference purposes only, can include or be based upon, but is not limited to, information associated with an object a user received in his/her mailbox (e.g., a message or piece of media included within a message, for example), a context of a user's activity on a network and the like (e.g., how did the user interact with the message or extracted entity content item, and/or some combination thereof.

As discussed above, reference to an "advertisement" should be understood to include, but not be limited to, digital media content that provides information provided by another user, service, third party, entity, and the like. Such digital ad content can include any type of known or to be known media renderable by a computing device, including, but not limited to, video, text, audio, images, and/or any other type of known or to be known multi-media. In some embodiments, the digital ad content can be formatted as hyperlinked multi-media content that provides deep-linking features and/or capabilities. Therefore, while the content is referred as an advertisement, it is still a digital media item that is renderable by a computing device, and such digital media item comprises digital content relaying promotional content provided by a network associated third party.

In Step 602, entity content information is identified. As discussed above, the entity content information can be based any of the information utilized or generated from/during the partitioning, analysis, identification and extraction outlined above with respect to FIG. 4. For purposes of this disclosure, Process 600 will refer to single extracted entity content item for serving additional content; however, it should not be construed as limiting, as any number of content items and messages, as well as programs used can form such basis, without departing from the scope of the instant disclosure.

In Step 604, a context is determined based on the identified entity content information. This context forms a basis for serving content related to the entity content information. In some embodiments, the context can be in accordance with whether a user interacted with the extracted entity content item, as discussed above in relation to FIGS. 3-4. For example, a user just purchased a plane ticket to Dallas, Tex., and received a confirmation itinerary email in her inbox; therefore, the context identified in Step 604 can be related to "travel" or, more specifically, "Dallas, Tex.", and can be leveraged in order to identify digital content related to such activity—e.g., a coupon for purchasing food at the Dallas-Fort Worth airport. In some embodiments, the identification of the context from Step 604 can occur before, during and/or after the analysis detailed above with respect to Process 400, or it can be a separate process altogether, or some combination thereof.

In Step 606, the determined context is communicated (or shared) with a content providing platform comprising a server and database (e.g., content server 106 and content database 107, and/or advertisement server 130 and ad database). Upon receipt of the context, the server performs (e.g., is caused to perform as per instructions received from the device executing the visual recognizer engine 300) a search for a relevant digital content within the associated database. The search for the content is based at least on the identified context.

In Step 608, the server searches the database for a digital content item(s) that matches the identified context. In Step 610, a content item is selected (or retrieved) based on the results of Step 608. In some embodiments, the selected content item can be modified to conform to attributes or capabilities of the page, interface, message, platform, application or method upon which the content item will be displayed, and/or to the application and/or device for which it will be displayed. In some embodiments, the selected content item is shared or communicated via the application the user is utilizing to view, render and/or interact with a media, content or object item. Step 612. In some embodiments, the selected content item is sent directly to a user computing device for display on the device and/or within the UI displayed on the device's display. In some embodiments, the selected content item is displayed within a portion of the interface or within an overlaying or pop-up interface associated with a rendering interface displayed on the device. In some embodiments, the selected content item can be displayed as part of a coupon/ad clipping, coupon/ad recommendation and/or coupon/ad summarization interface.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising the steps of:
 identifying, via a computing device, a message addressed to a user, said message comprising digital content associated with a third party entity;

analyzing, via the computing device, said identified message, and based on said analysis, identifying the Document Object Model (DOM) of the message;
partitioning, via the computing device, said DOM, said partitioning comprising analyzing links associated with the digital content within the DOM, and based on said analysis, determining a set of sub-trees within said DOM;
analyzing, via the computing device, the set of sub-trees, and based on said analysis, determining a candidate set of sub-trees from said set of sub-trees that comprise information indicating a type of sender;
executing, via the computing device, regular expression (regex) software on said candidate set of sub-trees, and based on said regex execution, identifying field information within the message that comprise entity content specific to said sender type;
extracting, via the computing device, said entity content from said field information of the message; and
propagating, via the computing device, said extracted entity content to the user.

2. The method of claim 1, further comprising:
identifying an end of the DOM; and
performing said analysis of the DOM by traversing the DOM in a bottom-up manner beginning at said end, said traversal of the DOM comprising identifying nodes for each link in the DOM.

3. The method of claim 2, further comprising:
determining, for each identified node, a number of links associated therewith;
determining, based on said number of links, whether to siphon out a sub-tree for the node, said sub-tree comprising the node as a rooted link separate from the DOM.

4. The method of claim 3, wherein said siphoned out sub-tree is part of the set of sub-trees.

5. The method of claim 1, wherein said analysis of the set of sub-trees comprises:
concatenating, for each sub-tree in said set of sub-trees, alt attributes and textual nodes of a respective sub-tree according to a character criteria, said character criteria associated with the sender type, wherein said determination of said candidate set of sub-trees is based on said concatenation.

6. The method of claim 1, further comprising:
storing, in a database associated with an inbox of the user, said extracted entity content.

7. The method of claim 6, wherein said storage further comprises storing said extracted entity content in a look-up table (LUT) in association with said field information.

8. The method of claim 6, further comprising:
receiving a request to communicate content to a user from said sender type;
searching, based on said request, said database for said content, and based on said searching, identifying said extracted entity content, wherein said propagation is based on said request.

9. The method of claim 1, wherein said identified message is an incoming message to an inbox of the user.

10. The method of claim 1, further comprising:
identifying a set of messages associated with an inbox of the user, wherein said steps are performed on said set of messages.

11. The method of claim 1, further comprising:
analyzing the extracted entity content, and based on said analysis, identifying entity content information for the user;
causing communication, over the network, of said entity content information to an advertisement platform to obtain a digital content item comprising digital advertisement content associated with said entity content information; and
communicating said identified digital content item to said user for display in association with an interface of an inbox.

12. A non-transitory computer-readable storage medium tangibly encoded with computer-executable instructions, that when executed by a processor associated with a computing device, performs a method comprising the steps of:
identifying, via the computing device, a message addressed to a user, said message comprising digital content associated with a third party entity;
analyzing, via the computing device, said identified message, and based on said analysis, identifying the Document Object Model (DOM) of the message;
partitioning, via the computing device, said DOM, said partitioning comprising analyzing links associated with the digital content within the DOM, and based on said analysis, determining a set of sub-trees within said DOM;
analyzing, via the computing device, the set of sub-trees, and based on said analysis, determining a candidate set of sub-trees from said set of sub-trees that comprise information indicating a type of sender;
executing, via the computing device, regular expression (regex) software on said candidate set of sub-trees, and based on said regex execution, identifying field information within the message that comprise entity content specific to said sender type;
extracting, via the computing device, said entity content from said field information of the message; and
propagating, via the computing device, said extracted entity content to the user.

13. The non-transitory computer-readable storage medium of claim 12, further comprising:
identifying an end of the DOM; and
performing said analysis of the DOM by traversing the DOM in a bottom-up manner beginning at said end, said traversal of the DOM comprising identifying nodes for each link in the DOM.

14. The non-transitory computer-readable storage medium of claim 13, further comprising:
determining, for each identified node, a number of links associated therewith;
determining, based on said number of links, whether to siphon out a sub-tree for the node, said sub-tree comprising the node as a rooted link separate from the DOM, wherein said siphoned out sub-tree is part of the set of sub-trees.

15. The non-transitory computer-readable storage medium of claim 12, wherein said analysis of the set of sub-trees comprises:
concatenating, for each sub-tree in said set of sub-trees, alt attributes and textual nodes of a respective sub-tree according to a character criteria, said character criteria associated with the sender type, wherein said determination of said candidate set of sub-trees is based on said concatenation.

16. The non-transitory computer-readable storage medium of claim 12, further comprising:
storing, in a database associated with an inbox of the user, said extracted entity content, said storing further comprising storing said extracted entity content in a look-up table (LUT) in association with said field information.

17. The non-transitory computer-readable storage medium of claim 16, further comprising;
- receiving a request to communicate content to a user from said sender type;
- searching, based on said request, said database for said content, and based on said searching, identifying said extracted entity content, wherein said propagation is based on said request.

18. The non-transitory computer-readable storage medium of claim 12, wherein said identified message is an incoming message to an inbox of the user.

19. The non-transitory computer-readable storage medium of claim 12, further comprising:
- identifying a set of messages associated with an inbox of the user, wherein said steps are performed on said set of messages.

20. A computing device comprising:
- a processor; and
- a non-transitory computer-readable storage medium for tangibly storing thereon program logic for execution by the processor, the program logic comprising:
  - logic executed by the processor for identifying, via the computing device, a message addressed to a user, said message comprising digital content associated with a third party entity;
  - logic executed by the processor for analyzing, via the computing device, said identified message, and based on said analysis, identifying the Document Object Model (DOM) of the message;
  - logic executed by the processor for partitioning, via the computing device, said DOM, said partitioning comprising analyzing links associated with the digital content within the DOM, and based on said analysis, determining a set of sub-trees within said DOM;
  - logic executed by the processor for analyzing, via the computing device, the set of sub-trees, and based on said analysis, determining a candidate set of sub-trees from said set of sub-trees that comprise information indicating a type of sender;
  - logic executed by the processor for executing, via the computing device, regular expression (regex) software on said candidate set of sub-trees, and based on said regex execution, identifying field information within the message that comprise entity content specific to said sender type;
  - logic executed by the processor for extracting, via the computing device, said entity content from said field information of the message; and
  - logic executed by the processor for propagating, via the computing device, said extracted entity content to the user.

* * * * *